US012760791B2

(12) United States Patent
Inokura et al.

(10) Patent No.: US 12,760,791 B2
(45) Date of Patent: Oct. 13, 2026

(54) TRANSAXLE

(71) Applicants: TOYOTA JIDOSHA KABUSHIKI KAISHA, Toyota (JP); AISIN CORPORATION, Kariya (JP)

(72) Inventors: Hiroki Inokura, Toyota (JP); Mizuki Bingo, Toyota (JP); Takashi Hasumi, Toyota (JP); Takayori Yamauchi, Kariya (JP); Masaki Yoshida, Kariya (JP); Satoshi Miyanaga, Kariya (JP); Yuki Kosaka, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 19/317,662

(22) Filed: Sep. 3, 2025

(65) Prior Publication Data

US 2026/0063198 A1 Mar. 5, 2026

(30) Foreign Application Priority Data

Sep. 4, 2024 (JP) ................................ 2024-152262

(51) Int. Cl.
*F16H 57/04* (2010.01)
*B60K 17/16* (2006.01)
(Continued)

(52) U.S. Cl.
CPC ......... *F16H 57/043* (2013.01); *B60K 17/165* (2013.01); *F16H 57/021* (2013.01);
(Continued)

(58) Field of Classification Search
CPC ... B60K 1/00; B60K 2001/001; F16H 57/043; F16H 57/0037; F16H 57/0457; F16H 57/0476; F16H 57/0018
See application file for complete search history.

(56) References Cited

U.S. PATENT DOCUMENTS 7,059,443 B2 * 6/2006 Kira .................... B60K 17/354 184/6.12
8,602,935 B2 * 12/2013 Katoh ...................... B60K 1/00 184/6.12
(Continued)

FOREIGN PATENT DOCUMENTS

CN 108953363 A * 12/2018 ........... F16H 57/043
DE 102021123189 A1 * 3/2023 ............. F16K 17/04
(Continued)

*Primary Examiner* — Sherry L Estremsky
(74) *Attorney, Agent, or Firm* — Dinsmore & Shohl LLP

(57) ABSTRACT

A transaxle mounted on a vehicle includes a shaft that integrally rotates together with both a coupling gear included in a gear mechanism and a rotor of an electric motor that is spaced apart from the coupling gear in an axial direction; a first oil passage formed in the shaft and configured to guide the oil scooped up by at least one gear included in the gear mechanism and supplied to an end portion of the shaft on the side of the coupling gear to a predetermined cooling target in a case; a second oil passage formed in the shaft and configured to guide the oil supplied from a pump to an end portion of the shaft on the side of the rotor; and a closure disposed in the shaft and configured to guide restrict communication between the first oil passage and the second oil passage.

3 Claims, 2 Drawing Sheets

(51) Int. Cl.

| | |
|---|---|
| ***F16H 57/021*** | (2012.01) |
| *B60K 6/365* | (2007.10) |
| *B60K 6/405* | (2007.10) |
| *F16H 57/02* | (2012.01) |
| *H02K 7/116* | (2006.01) |

(52) U.S. Cl.

CPC ..... *F16H 57/0415* (2013.01); *F16H 57/0436* (2013.01); *F16H 57/045* (2013.01); *F16H 57/0457* (2013.01); *F16H 57/0471* (2013.01); *F16H 57/0483* (2013.01); *B60K 6/365* (2013.01); *B60K 6/405* (2013.01); *B60Y 2200/92* (2013.01); *B60Y 2400/80* (2013.01); *F16H 2057/02034* (2013.01); *F16H 2057/02052* (2013.01); *H02K 7/116* (2013.01)

(56) References Cited

U.S. PATENT DOCUMENTS

| | | | | |
|---|---|---|---|---|
| 9,303,698 | B2 * | 4/2016 | Sugiyama | F16H 57/0445 |
| 11,137,061 | B2 * | 10/2021 | Ishikawa | F16H 57/0441 |
| 12,181,037 | B2 * | 12/2024 | Katayama | F16H 57/045 |
| 2013/0145879 | A1 * | 6/2013 | Nakamura | F16H 57/0441<br>74/467 |
| 2016/0076416 | A1 | 3/2016 | Kodama et al. | |
| 2022/0074487 | A1 * | 3/2022 | Inoue | F16H 57/0495 |
| 2022/0281310 | A1 * | 9/2022 | Nakata | F16H 57/045 |

FOREIGN PATENT DOCUMENTS

| | | | | |
|---|---|---|---|---|
| JP | 2016-061327 A | | 4/2016 | |
| JP | 2017105372 A | * | 6/2017 | F16H 57/0018 |

* cited by examiner

TRANSAXLE

CROSS-REFERENCE TO RELATED APPLICATION

The present disclosure claims priority to Japanese Patent Application No. 2024-152262 filed on Sep. 4, 2024, which is incorporated herein by reference in its entirety including specification, drawings and claims.

TECHNICAL FIELD

The present disclosure relates to a transaxle mounted on a vehicle.

BACKGROUND

A conventionally known hydraulic control device supplies oil from a mechanical oil pump driven by a drive source of a vehicle that includes at least an engine and an electric oil pump driven by an electric motor different from the drive source to oil supplied portions of the vehicle such as first and second motor generators and a power split mechanism (see, for example, Japanese Patent Application Laid Open No. 2016-061327). The hydraulic control device includes a first oil passage connected to the mechanical oil pump, a second oil passage connected to the electric oil pump, a first check valve, a second check valve, a third oil passage, and an orifice mechanism. The first check valve is disposed between a confluence of the first and second oil passages and the mechanical oil pump, and only allows oil to flow from the mechanical oil pump to the oil supplied portions. The second check valve is disposed between the confluence and the electric oil pump and only allows oil to flow from the electric oil pump to the oil supplied portions. The third oil passage is arranged between the confluence and the electric oil pump and configured to bypass the second check valve and to communicate the confluence with the electric oil pump. The orifice mechanism is disposed in the third oil passage and configured to regulate a flow rate of the oil discharged by the mechanical oil pump.

SUMMARY

The above conventional hydraulic control system allows more oil from both the mechanical oil pump and the electric oil pump to be supplied to the oil supplied portions as a cooling medium. However, when the temperature of the oil from the mechanical oil pump is different from that of the oil from the electric oil pump, the temperature of the oil becomes higher at the confluence of the first and second oil passages, such that the oil supply section may not be cooled efficiently.

A main object of the present disclosure is to provide a transaxle that allows cooling targets in the case to be efficiently cooled.

The transaxle of the present disclosure is a transaxle that is mounted on a vehicle and includes an electric motor, a gear mechanism that includes at least a differential gear and is connected to the electric motor, a case that houses the electric motor and the gear mechanism, and a pump that sucks oil reserved in the case and discharges the oil. Further, the transaxle includes a shaft that integrally rotates together with both a coupling gear included in the gear mechanism and a rotor of the electric motor that is spaced apart from the coupling gear in an axial direction. The shaft includes a first oil passage, a second oil passage and a closure. The first oil passage is formed in the shaft and configured to direct the oil scooped up by at least one gear included in the gear mechanism and supplied to an end portion of the shaft on the side of the coupling gear to a predetermined cooling target in the case. The second oil passage is formed the shaft and configured to guide the oil supplied from the pump to an end portion of the shaft on the side of the rotor. The closure is disposed in the shaft and configured to restrict communication between the first oil passage and the second oil passage.

This enables the oil scooped up by at least one gear of the gear mechanism to be directed from the first oil passage to the predetermined cooling target in the case without mixing the oil in the first oil passage with the oil in the second oil passage, and the oil from the pump to be directed from the second oil passage to the rotor of the electric motor as another cooling target in the case. As a result, the temperature of one of the oil in the first oil passage and the oil in the second oil passage is prevented from increasing due to the temperature rise of the other, thereby enabling the predetermined cooling target in the case and the electric motor, which is another cooling target, to be cooled efficiently.

DESCRIPTION OF EMBODIMENTS

The following describes some aspects of the present disclosure with reference to drawings.

Figure 1:
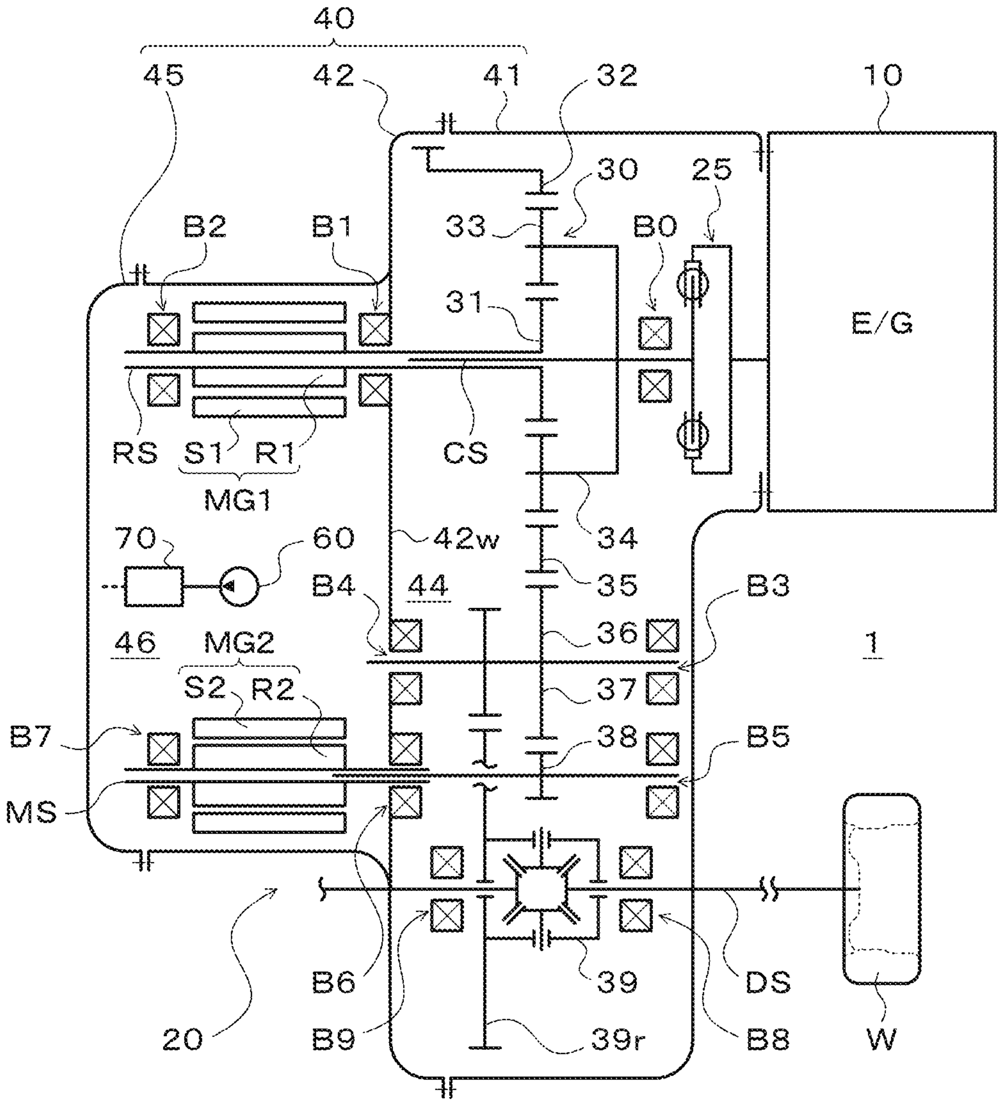
FIG. 1 is a schematic configuration diagram illustrating a vehicle including a transaxle of the present disclosure.

FIG. 1 is a schematic configuration diagram showing a vehicle 1 that includes a transaxle 20 of the present disclosure. The vehicle 1 shown in the diagram is a front-wheel drive hybrid electric vehicle that includes an engine (internal combustion engine) 10, the transaxle 20 as a power transmission device that is connected to the engine 10 and includes motor generators MG1 and MG2, and a battery (storage device) that exchanges electric power with the motor generators MG1 and MG2 of the transaxle 20, which is not shown. The engine 10 is a gasoline engine that burns a mixture of gasoline (hydrocarbon fuel) and air in a plurality of combustion chambers and converts a reciprocating motion of pistons caused by the combustion of the mixture into a rotational motion of a crankshaft. The engine 10 may also be an LPG engine or a diesel engine.

The transaxle 20 includes, in addition to the motor generators MG1 and MG2, a planetary gear 30, a differential gear 39 and a case 40 that houses these elements, as shown in FIG. 1. The motor generator MG1 (first electric motor) is a synchronous electric motor generator (three-phase alternating current motor) that includes a stator S1 and a rotor R1 and mainly operates as a generator to convert at least a part of power from the engine 10, which is operated under load, into electric power. The motor generator MG2 (second electric motor) is a synchronous electric motor generator (three-phase alternating current motor) that includes a stator S2 and a rotor R2 and mainly operates as an electric motor driven by electric power from at least one of the battery and the motor generator MG1 to generate drive torque. The motor generators MG1 and MG2 exchange electric power with the above battery via a power control unit (PCU), which includes an inverter and is not shown, and also exchange electric power with each other via the power control unit.

The planetary gear 30 includes a sun gear (first rotating element) 31, a ring gear (second rotating element) 32 and a planet carrier (third rotating element) 34 that rotatably supports a plurality of pinion gears 33. As shown in FIG. 1, the sun gear 31 is connected to the rotor R1 of the motor generator MG1 via a hollow rotor shaft RS. The planet carrier 34 is fixed coaxially to a carrier shaft CS and is connected to the crankshaft of the engine 10 via the carrier shaft CS and a damper mechanism 25. The ring gear 32 is integrated with the counter drive gear 35 as an output element, and both rotate coaxially and integrally.

The counter drive gear 35 is connected to left and right wheels (drive wheels) W via a counter driven gear 36 that meshes with the counter drive gear 35, a drive pinion gear (final drive gear) 37 that rotates together with the counter driven gear 36, a differential ring gear 39*r* that meshes with the drive pinion gear 37 and rotates with a differential case of the differential gear 39, the differential gear 39, and the drive shaft DS. A gear mechanism of the transaxle 20, that is, the gear train from the planetary gear 30 and the counter drive gear 35 to the differential gear 39, connects the engine 10 and the motor generator MG1 to each other and also transmits a part of output torque of the engine 10 or a drive source to the drive shafts DS and the wheels W.

A coupling gear (reduction gear) 38 is connected (fixed) to the rotor R2 of the motor generator MG2 via a motor shaft MS to be separated from the rotor R2 in the axial direction of the motor shaft MS. That is, the motor shaft MS rotates coaxially and integrally with the coupling gear 38, which is included in the gear mechanism of the transaxle 20, and the rotor R2 of the motor generator MG2, which is disposed axially away from the coupling gear 38. The coupling gear 38 has a smaller number of teeth than the counter driven gear 36, and meshes with the counter driven gear 36.

Thus, the motor generator MG2 is connected to the left and right drive shafts DS and the wheels W via the coupling gear 38, the counter driven gear 36, the drive pinion gear 37, the differential ring gear 39*r* and the differential gear 39. The motor generator MG2 operates as a drive source to output drive torque (driving force) to the drive shafts DS and the wheels W, either alone or in cooperation with the engine 10, and also outputs regenerative braking torque when the vehicle 1 is braked.

The case 40 of the transaxle 20 includes a first case 41, a second case 42 and a cover (third case) 45. The first and second cases 41, 42 and the cover 45 are all castings formed, for example, from aluminum alloy or steel. The first case 41 is fastened (coupled) to an engine block of the engine 10 via a plurality of bolts. The second case 42 is fastened (coupled) to the first case 41 via a plurality of bolts and constitutes a case body together with the first case 41. The second case 42 includes a partition wall 42*w* that divides an interior of the case 40 (case body) into two parts. The cover 45 is fastened (coupled) to the second case 42 via a plurality of bolts to cover an open end of the second case 42 on the opposite side of the first case 41.

In this embodiment, the carrier shaft CS, which is fixed to the planet carrier 34 of the planetary gear 30, is supported by a bearing (for example, a needle bearing) B0 held by the first case 41. Further, the rotor shaft RS, which is fixed to the sun gear 31 of the planetary gear 30 and the rotor R1 of the motor generator MG1, is supported by a bearing (for example, a ball bearing) B1 held by the partition wall 42*w* of the second case 42 and a bearing (for example, a ball bearing) B2 held by the cover 45. The counter shaft, which is fixed to the counter driven gear 36 and the drive pinion gear 37, is supported by a bearing (for example, a tapered roller bearing) B3 held by the first case 41 and a bearing (for example, a tapered roller bearing) B4 held by the partition wall 42*w*.

The motor shaft MS, which rotates together with the rotor R2 and the coupling gear 38, is supported by bearings B5, B6 and B7, which are ball bearings, for example. That is, an end portion of the motor shaft MS on the coupling gear 38 side (the left end in FIG. 1) is supported by the bearing (first bearing) B5, which is held by the first case 41. Further, an end of the motor shaft MS on the side of the rotor R2 (the right end in FIG. 1) is supported by the bearing (second bearing) B7 held by the cover 45. Furthermore, the motor shaft MS is supported by the bearing (intermediate bearing) B6 held by the partition wall 42*w* of the second case 42 between the coupling gear 38 and the rotor R2 in the axial direction. The differential case of the differential gear 39 is supported by a bearing (for example, a tapered roller bearing) B8 held by the first case 41 and a bearing (for example, a tapered roller bearing) B9 held by the second case 42.

As shown in FIG. 1, a gear chamber 44 is defined inside the case 40 on the side of the engine 10 of the partition wall 42*w* and a motor chamber 46 is defined on the side of the cover 45 of the partition wall 42*w*. As shown in the figure, the gear mechanism, that is, the gear train from the planetary gear 30 and the counter drive gear 35 to the differential gear 39, is arranged in the gear chamber 44. The motor generators MG1 and MG2 are arranged in the motor chamber 46. Further, an operating oil reservoir for reserving operating oil (ATF) as a lubrication and cooling medium is defined in a lower portion of the motor chamber 46. A strainer (not shown) and an electric oil pump 60 are disposed in the operating oil reservoir.

The strainer is fixed in the operating oil reservoir, for example, such that a suction port disposed at its bottom portion opens downwards. An inlet port of the electric oil pump 60 is connected to an oil discharge port of the strainer, and a hollow oil pipe (not shown) is connected to a discharge port of the electric oil pump 60. The electric oil pump 60 sucks in the operating oil in the operating oil reservoir and supplies the sucked-in operating oil to an air-cooled type or a water-cooled type oil cooler 70 via the oil pipe and the like. The operating oil from the electric oil pump 60 is cooled to around room temperature (20-25° C.) in the oil cooler 70 and is supplied to lubrication and cooling targets in the case 40, that is, the gear chamber 44 and the motor chamber 46, via oil passages formed in the cover 45 and the like. The lubrication and cooling targets include the motor generators MG1 and MG2, the planetary gears 30, the gears 35-39*r*, the differential gear 39 and the bearings B0-B9 and the like.

The operating oil supplied from the electric oil pump 60 to the motor chamber 46 passes through the lubrication and cooling targets such as the motor generator MG1, MG2, and bearings B2, B7, and then flows down to the operating oil reservoir in the motor chamber 46. Further, the operating oil supplied from the electric oil pump 60 to the gear chamber 44 passes through the lubrication and cooling targets in the gear chamber 44, such as the planetary gear 30, gears 35-39*r*, differential gear 39, and bearings B0, B1, B3-B6, B8, B9, and flows down to a lower portion of the gear chamber 44. Furthermore, the operating oil that flows down into the gear chamber 44 is scooped up by the differential ring gear 39*r*, the coupling gear 38, the counter driven gear 36, the counter drive gear 35, and the like, and supplied to the lubrication and cooling target in the gear chamber 44. In addition, the partition wall 42*w* of the second case 42 is provided with multiple oil holes not shown in the figure, corresponding to the counter drive gear 35, the coupling gear 38, or the differential ring gear 39*r*, respectively. A part of the operating oil that is scooped up in the gear chamber 44 flows into the motor chamber 46 through these oil holes. Furthermore, the partition wall 42*w* has multiple unillustrated through holes that communicate between the lower portion of the motor chamber 46, that is, the operating oil reservoir, and the lower portion of the gear chamber 44.

Figure 2:
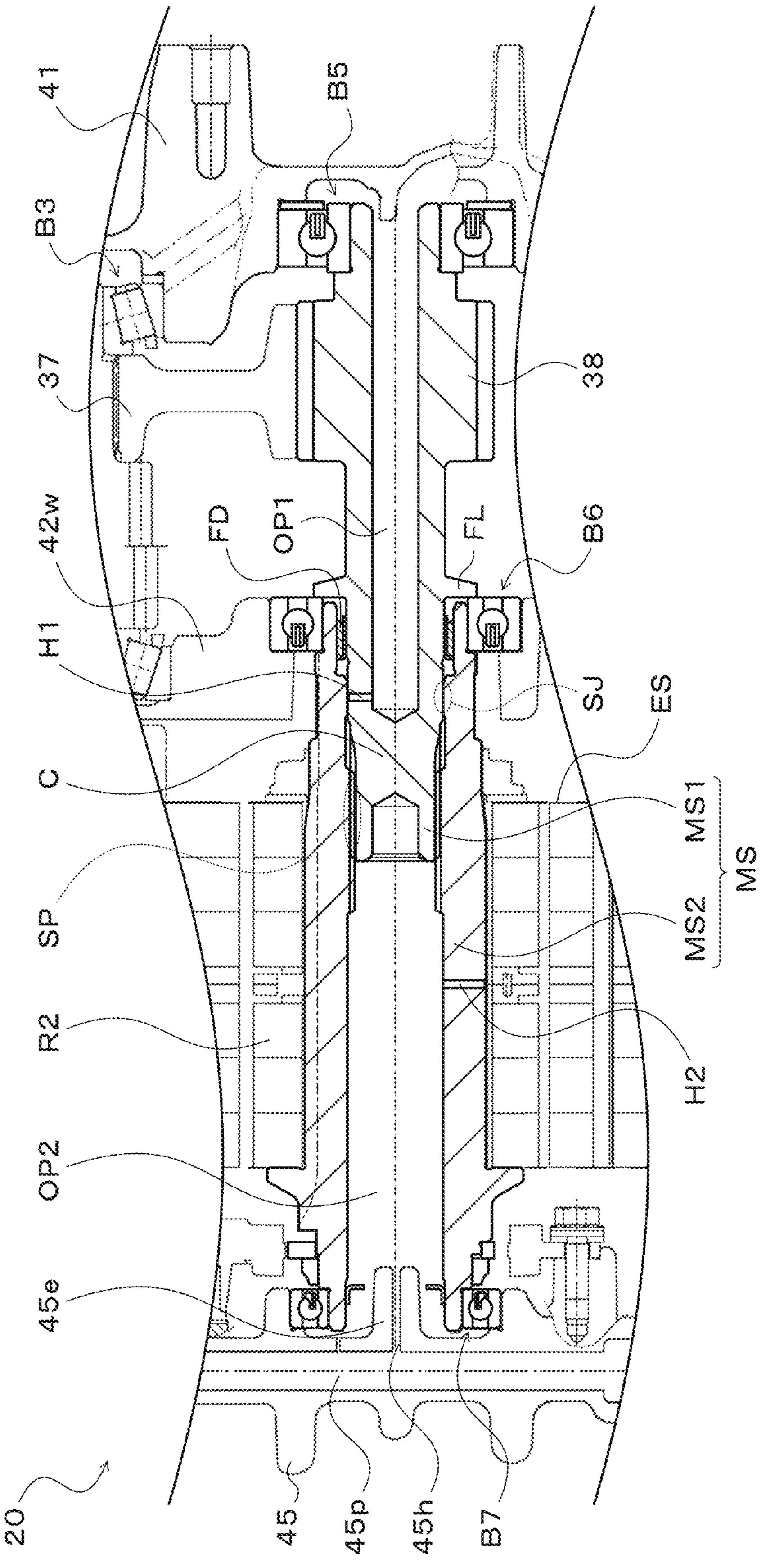
FIG. 2 is an enlarged sectional view illustrating the transaxle of the present disclosure.

FIG. 2 is an enlarged view illustrating a part of the transaxle 20. As shown in the figure, the motor shaft MS includes a metal first shaft MS1 and a metal second shaft MS2 that is coaxially connected to the first shaft MS1 and configured to rotate integrally with the first shaft MS1. In this embodiment, the first shaft MS1 is integrally formed with the coupling gear 38. The coupling gear 38 may, however, be formed separately from the first shaft MS1 and fixed to the first shaft MS1. The first shaft MS1 includes a first oil passage OP1. The first oil passage OP1 is a circular hole that opens at one end of the first shaft MS1 (the right end in FIG. 2) and extends along an axis of the first shaft MS1.

Further, at the other end of the first shaft MS1 (the left end in FIG. 2), a closure C is formed to close an end opposite to the opening of the first oil passage OP1. Furthermore, the first shaft MS1 is provided with a plurality of first oil supply holes H1 spaced circumferentially. Each first oil supply hole H1 opens near the closure C and on an inner circumference surface of the first shaft MS1, and is connected to the first oil passage OP1. The first shaft MS1 may have only one first oil supply hole H1.

The second shaft MS2 is inserted into a core center hole of the rotor R2 (rotor core) of the motor generator MG2 and fixed to the rotor R2 by a tight fit such as shrink fitting or press fitting. As shown in FIG. 2, the second shaft MS2 is hollow and includes a through hole (circular hole) that extends along an axis of the second shaft MS2 and forms a second oil passage OP2. Further, in a central portion of the second shaft MS2 in a longitudinal direction, a plurality (in this embodiment, for example, eight) of second oil supply holes H2 are formed at intervals in a circumferential direction. Each second oil supply hole H2 opens on an inner circumference surface of the second shaft MS2 and is connected to the second oil passage OP2, and extends in a radial direction of the second shaft MS2 and opens on an outer circumference surface of the second shaft MS2 that is surrounded by an inner circumference surface of the rotor R2.

As shown in FIG. 2, an end of the closure C of the first shaft MS1 is fitted into a through hole of the second shaft MS2, that is, the second oil passage OP2, from one end of the second shaft MS2 (the right end in the figure). In this embodiment, splines are formed on an outer circumferential surface of the side of the closure C of the first shaft MS1 and on an inner circumferential surface of the second shaft MS2, and the splines of the first and second shafts MS1 and MS2 mesh with each other to form a spline fitting portion SP. Further, the outer circumference of the first shaft MS1 and the inner circumference of the second shaft MS2 are closely fitted together on the side of coupling gear 38 of the spline fitting portion SP (right side in FIG. 2) to form a spigot fitting portion SJ. Furthermore, an end face of one end of the second shaft MS2 is butted against a flange portion FL formed on the first shaft MS1. In addition, a friction damper FD is disposed between the outer circumferential surface of the first shaft MS1 and the inner circumferential surface of the second shaft MS2, and between the spigot fitting portion SJ and the flange portion FL in the axial direction.

Thus, the first and second shafts MS1 and MS2 are connected in a rotational direction via the spline fitting portion SP, and are also connected coaxially via the spigot fitting portion SJ. When the first and second shafts MS1 and MS2 are connected, the closure C formed at the other end of the first shaft MS1 restricts communication between the first oil passage OP1 of the first shaft MS1 and the second oil passage OP2 of the second shaft MS2. Further, one end of the first shaft MS1 (the right end in FIG. 2) forms an end of the coupling gear 38 of the motor shaft MS and is supported by the bearing B5 held by the first case 41. Furthermore, one end of the second shaft MS2 (the right end in FIG. 2) is supported by the bearing B6, which is held by the partition wall 42*w* of the second case 42 between the coupling gear 38 (flange portion FL) and the spigot fitting portion SJ (rotor R2) in the axial direction. In addition, the other end of the second shaft MS2 (the left end in FIG. 2) forms an end of the motor shaft MS on the side of the rotor R2 and is supported by the bearing B7, which is held by the cover 45.

When the motor shaft MS, which includes the first and second shafts MS1 and MS2, is disposed in the case 40, the first oil passage OP1 of the first shaft MS1 opens near the bearing B5, and the second oil passage OP2 of the second shaft MS2 opens near the bearing B7. Further, an extended portion 45*e* extending from the cover 45 is inserted into the opening of the second oil passage OP2. The extended portion 45*e* includes an oil hole 45*h* that communicates with an oil passage 45*p* formed in the cover 45 and opens at a tip of the extended portion 45*e*.

Furthermore, each first oil supply hole H1 of the first shaft MS1 is located between the bearing (intermediate bearing) B6 and an end face ES of the rotor R2 on the side of the coupling gear 38 in the axial direction, as shown in FIG. 2, and opens on the outer circumference surface of the first shaft MS1, which forms the spigot fitting portion SJ. In addition, each second oil supply hole H2 of the second shaft MS2 is opposite to the central portion of the inner circumference surface of the rotor R2 (rotor core) in the axial direction of the rotor R2 (left side in FIG. 2) on the side of the rotor R2 (left side in FIG. 2) of each first oil supply hole H1 in the axial direction of the motor shaft MS, and communicates with a corresponding refrigerant passage of the rotor R2 via a communication passage formed in the rotor R2. In this embodiment, the rotor R2 (rotor core) includes a plurality of refrigerant passages that are spaced apart in a circumferential direction and extend in the axial direction radially outside the core center hole. Further, the closure C of the first shaft MS1 restricts the communication between the first and second oil passages OP1 and OP2 between the first oil supply hole H1 and the second oil supply hole H2 in the axial direction, and more specifically, between the first oil supply hole H1 and the end face ES of the rotor R2 on the side of the coupling gear 38 in the axial direction.

While the vehicle 1 including the transaxle 20 described above is driven, the operating oil that is scooped up by the differential ring gear 39*r*, the coupling gear 38, the counter drive gear 35, and the like in the gear chamber 44 and the operating oil that passes through the bearings B5, and the like flows into the first oil passage OP1 of the rotating motor shaft MS, or the first shaft MS1, from the opening on one end of the first shaft MS1. The operating oil that flows into the first oil passage OP1 flows from the first oil passage OP1 into each first oil supply hole H1 due to centrifugal force and is supplied to the spigot fitting portion SJ as the cooling target. This enables the spigot fitting portion SJ (metal-touch portion) where the outer circumference surface of the first shaft MS1 and the inner circumference surface of the second shaft MS2 are in close contact with each other to be cooled well using the operating oil that is scooped up in the gear chamber 44. The operating oil supplied to the spigot fitting portion SJ passes through a minute gap between the outer circumference surface of the first shaft MS1 and the inner circumference surface of the second shaft MS2, the friction damper FD, and a gap between an inner race of the bearing B6 and the partition wall 42*w*, and flows downward to the lower portion of the gear chamber 44.

While the vehicle 1 is driven, the rotating motor shaft MS, that is, the opening on the other end of the second shaft MS2 or the second oil passage OP2, is supplied with operating oil that is discharged from the electric oil pump 60 and cooled in the oil cooler 70 via the oil passage 45*p* of the cover 45 and the oil hole 45*h* of the extended portion 45*e*. The operating oil that flows into the second oil passage OP2 flows from the second oil passage OP2 into each second oil supply hole H2 due to centrifugal force, and then flows from each second oil supply hole H2 into the corresponding refrigerant passage of the rotor R2 via the communication passage formed in the rotor R2. As a result, the entire rotor R2 (rotor core and permanent magnets) are cooled effectively by the operating oil flowing through the plurality of refrigerant passages, and the like. The operating oil supplied to the rotor R2 takes heat away from the rotor R2, flows out from the opening of each refrigerant passage to the outside, and is spread out radially outward due to centrifugal force. The operating oil that is spread out outside the rotor R2 flows down to the operating oil reservoir in the motor chamber 46.

In the transaxle 20, the closure C formed at the other end of the first shaft MS1 restricts the communication between the first oil passage OP1 of the first shaft MS1 and the second oil passage OP2 of the second shaft MS2. Therefore, the operating oil that is pumped up in the gear chamber 44 and supplied to the first oil passage OP1 does not mix with the operating oil supplied to the second oil passage OP2 via the electric oil pump 60 and the oil cooler 70. This enables the operating oil that is scooped up in the gear chamber 44 to be supplied to the spigot fitting portion SJ, which is the predetermined cooling target, from the first oil supply hole H1, while the operating oil from the electric oil pump 60, which is cooled by the oil cooler 70, is supplied to the rotor R2 to cool the motor generator MG2, which is another cooling target, effectively. In addition, the part of the operating oil supplied from the electric oil pump 60 via the oil cooler 70 to the second oil passage OP2 passes through the spline fitting portion SP and flows into the spigot fitting portion SJ. This allows the spline fitting portion SP and the spigot fitting portion SJ to be cooled by the part of the operating oil from the electric oil pump 60.

As has been described above, the transaxle 20 mounted on the vehicle 1 includes the motor generator MG2, the gear mechanism including at least the differential gear 39 and connected to the motor generator MG2, the case 40 that houses the motor generator MG2 and the gear mechanism, and the electric oil pump 60 that sucks in and discharges the operating oil reserved in the case 40. Further, the transaxle 20 includes the motor shaft MS that rotates integrally with the coupling gear 38 included in the gear mechanism and the rotor R2 of the motor generator MG2 that is disposed axially away from the coupling gear 38. The motor shaft MS includes the first oil passage OP1, the second oil passage OP2, and the closure C. The first oil passage OP1 is formed in the motor shaft MS (first shaft MS1) to direct the operating oil that is scooped up by at least one gear included in the gear mechanism such as the differential ring gear 39*r* and supplied to the end portion of the motor shaft MS on the side of the coupling gear 38 (one end of the first shaft MS1) to the spigot fitting portion SJ, which is the cooling target in the case 40. The second oil passage OP2 is formed in the motor shaft MS (second shaft MS2) to direct the operating oil supplied from the electric oil pump 60 to the end of the motor shaft MS (other end of the second shaft MS2) on the side of the rotor R2 to the rotor R2. The closure C is disposed in the motor shaft MS (first shaft MS1) to restrict the communication between the first oil passage OP1 and the second oil passage OP2.

This allows the operating oil that is scooped up by the differential ring gear 39*r* and the like to be directed from the first oil passage OP1 to the spigot fitting portion SJ, which is the cooling target, without mixing the operating oil in the first oil passage OP1 with the operating oil in the second oil passage OP2. Further, this allows the operating oil from the electric oil pump 60 to be directed to the rotor R2 of the motor generator MG2, which is another cooling target inside the case 40, via the second oil passage OP2. As a result, the temperature of the operating oil in the second oil passage OP2, which is cooled by the oil cooler 70, is prevented from rising due to the temperature increase of the operating oil in the first oil passage OP1, thereby enabling efficient cooling of the spigot fitting portion SJ and the motor generator MG2 as cooling targets.

Further, the motor shaft MS (first or second shaft MS1, MS2) includes the first oil supply hole H1, which communicates with the first oil passage OP1 and supplies the operating oil to the spigot fitting portion SJ, and the second oil supply hole H2, which communicates with the second oil passage OP2 and opens on the outer circumference surface of the motor shaft MS (second shaft MS2) surrounded by the inner circumference surface of the rotor R2. Furthermore, the closure C is disposed between the first oil supply hole H1 and the second oil supply hole H2 in the axial direction. In the transaxle 20, the operating oil discharged from the electric oil pump 60 is supplied to the second oil passage OP2 via the oil cooler 70.

This allows the oil discharged from the electric oil pump 60 and cooled by the oil cooler 70 to be supplied to the rotor R2 without being heated by mixing with the operating oil that is scooped up in the gear chamber 44, thereby enabling the motor generator MG2 to be cooled effectively. In the above described transaxle 20, the temperature of the operating oil flowing out of the oil cooler 70 may be detected, and the oil cooler 70 and the like may be controlled such that the detected temperature becomes a desired temperature.

Furthermore, the transaxle 20 includes the bearing (first bearing) B5 that supports one end of the first shaft MS1, that is, the end of the motor shaft MS on the side of the coupling gear 38, the bearing (second bearing) B7 that supports the other end of the second shaft MS2, that is, the end of the motor shaft MS on the side of the rotor R2, and the bearing (intermediate bearing) B6 that supports the motor shaft MS between the coupling gear 38 and the rotor R2 in the axial direction. The first oil supply hole H1 is disposed between the bearing B6 and the end face ES of the rotor R2 on the side of the coupling gear 38 in the axial direction.

This enables the relatively long motor shaft MS, which rotates integrally with the coupling gear 38 and the rotor R2 of the motor generator MG2, to be stably supported, and also enables the operating oil that is scooped up in the gear chamber 44 (case 40) to be supplied to the spigot fitting portion SJ (cooling target) located between the bearing B6 and the rotor R2 in the axial direction from the first oil supply hole H1. The cooling target of the operating oil supplied to the first oil passage OP1 is not limited to the spigot fitting portion SJ, but may be arbitrarily determined within the range where the operating oil can be supplied from the first oil passage OP1.

In the transaxle 20, the motor shaft MS includes the first shaft MS1, which includes the first oil passage OP1 and rotates integrally with the coupling gear 38, and the second shaft MS2, which includes the second oil passage OP2 and is fixed to the rotor R2. Further, the first shaft MS1 is fitted within the second oil passage OP2 and configured to rotate integrally with the second shaft MS2. In addition, the closure C is formed at the end of the first shaft MS1 on the side of the second shaft MS2.

This makes it possible to easily form the first oil passage OP1, the second oil passage OP2, and the closure C with respect to the motor shaft MS. In the transaxle 20, the closure C may be formed at the end of the second shaft MS2 on the side of the first shaft MS1, and the motor shaft MS may be a single shaft member including the first oil passage OP1, the second oil passage OP2, and the closure C.

Further, the first and second shafts MS1 and MS2 are connected in the rotational direction via the spline fitting portion SP, and are also connected coaxially via the spigot fitting portion SJ, in which the outer circumference surface of the first shaft MS1 is in close contact with the inner circumference surface of the second shaft MS2 on the side of the coupling gear 38 of the spline fitting portion SP. In addition, in the transaxle 20, the part of the operating oil supplied to the second oil passage OP2 passes through the spline fitting portion SP and flows into the spigot fitting portion SJ.

This allows the spline fitting portion SP and the spigot fitting portion SJ to be cooled by the operating oil that is scooped up in the gear chamber 44, and also allows the spline fitting portion SP and the spigot fitting portion SJ to be cooled by the part of the operating oil from the electric oil pump 60. As a result, it becomes possible to effectively suppress wear of the first and second shafts MS1 and MS2 at the spline fitting portion SP and the spigot fitting portion SJ.

The vehicle 1 may be a plug-in hybrid electric vehicle (PHEV) or a one-motor hybrid vehicle. The transaxle 20 may also be modified to be installed in a battery electric vehicle (BEV) or a fuel cell vehicle (FCEV).

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

Industrial Applicability

The technique of the present disclosure is applicable to, for example, the manufacturing industry of the transaxle.

The invention claimed is:

1. A transaxle that is mounted on a vehicle and includes an electric motor, a gear mechanism that includes at least a differential gear and is connected to the electric motor, a case that houses the electric motor and the gear mechanism, and a pump that sucks oil reserved in the case and discharges the oil, the transaxle comprising:

a shaft that integrally rotates together with both a coupling gear included in the gear mechanism and a rotor of the electric motor that is spaced apart from the coupling gear in an axial direction;

a first oil passage formed in the shaft and configured to guide the oil scooped up by at least one gear included in the gear mechanism and supplied to an end portion of the shaft on the side of the coupling gear to a predetermined cooling target in the case;

a second oil passage formed in the shaft and configured to guide the oil supplied from the pump to an end portion of the shaft on the side of the rotor; and a closure disposed in the shaft and configured to restrict communication between the first oil passage and the second oil passage;

wherein:

the shaft includes a first shaft with the first oil passage and rotates integrally with the coupling gear, and a second shaft with the second oil passage and is fixed to the rotor;

the first shaft is fitted within the second oil passage and configured to rotate integrally with the second shaft;

the closure is formed at an end of the first shaft on the side of the second shaft;

the first and second shafts are connected in a rotational direction via a spline fitting portion, and are also connected coaxially via a spigot fitting portion in which an outer circumference surface of the first shaft closely contacts an inner circumference surface of the second shaft on the side of the coupling gear of the spline fitting portion;

the cooling target is the spigot fitting portion; and a part of the oil supplied to the second oil passage passes through the spline fitting portion and flows into the spigot fitting portion.

2. The transaxle according to claim 1, wherein:

the shaft includes a first oil supply hole that communicates with the first oil passage and supplies the oil to the side of the cooling target, and a second oil supply hole that communicates with the second oil passage and opens on an outer circumference surface of the shaft that is surrounded by an inner circumference surface of the rotor;

the closure is arranged between the first oil supply hole and the second oil supply hole in the axial direction; and the oil discharged from the pump is supplied to the second oil passage via an oil cooler.

3. The transaxle according to claim 2, further comprising:

a first bearing that supports the end portion of the shaft on the side of the coupling gear;

a second bearing that supports the end portion of the shaft on the side of the rotor; and an intermediate bearing that supports the shaft between the coupling gear and the rotor in the axial direction, wherein the first oil supply hole is disposed between the intermediate bearing and an end face of the rotor on the side of the coupling gear in the axial direction.

* * * * *